United States Patent [19]

Smart, Jr. et al.

[11] 4,109,895
[45] Aug. 29, 1978

[54] REMOTE ACTUATED METERING VALVE

[75] Inventors: William A. Smart, Jr., Pewaukee; Scott H. Gumm, West Bend, both of Wis.

[73] Assignee: Bradley Corporation, Menomonee Falls, Wis.

[21] Appl. No.: 738,597

[22] Filed: Nov. 3, 1976

[51] Int. Cl.² ............................................ F16K 31/383
[52] U.S. Cl. ......................................... 251/41; 251/4; 251/44
[58] Field of Search ......................... 251/41, 44, 45, 4

[56] References Cited

U.S. PATENT DOCUMENTS

| 916,758 | 3/1909 | Murphy | 251/41 |
|---|---|---|---|
| 1,587,516 | 6/1926 | Forfar | 251/41 X |
| 2,464,917 | 3/1949 | Babson | 251/4 X |
| 2,664,095 | 12/1953 | Magni | 251/4 X |

FOREIGN PATENT DOCUMENTS

| 446,225 | 9/1912 | France | 251/41 |
|---|---|---|---|
| 1,116,072 | 1/1956 | France | 251/41 |

*Primary Examiner*—Arnold Rosenthal
*Attorney, Agent, or Firm*—Thad F. Kryshak

[57] ABSTRACT

A remote actuated metering valve system for supplying water to a washing fixture includes a main metering valve and at least one remote actuating relief valve connected to the main valve by tubing. The main metering valve has an inlet and an outlet with a valve seat between them and a movable piston which when the valve is in the normal closed position has its front face seated on the valve seat and its elongated nose projecting through the valve seat. The piston is maintained in the closed position by supply line pressure which is transferred via a bypass timing circuit to a pressure chamber behind the piston where it is sensed by the rear face of the piston. The pressure chamber of the main valve is connected by tubing to a normally closed remote push button relief valve. A second length of tubing leads from the relief valve to the supply source at a point downstream of the valve seat. When the push button of the relief valve is depressed, the relief valve is opened allowing the pressure in the pressure chamber of the main valve to be reduced. Inlet pressure acting on the front face of the piston forces it off the valve seat and forces fluid out of the pressure chamber out through the remote relief valve. As soon as the push button is released, the relief valve closes and the timing of the flow period starts. Inlet fluid flowing through the bypass timing circuit passes through a timing mechanism refilling the pressure chamber at a controlled rate. The preferred timing mechanism comprises a disc of deformable material which is positioned in a bore in the bypass circuit and has an axial opening through which fluid must pass to reach the pressure chamber and an adjustable member which is employed to selectively exert an axially directed force upon the disc to deform the material of the disc into the axial opening thereby effectively reducing its effective diameter. The more the disc is compressed the smaller the effective diameter of the disc and the longer the flow period.

1 Claim, 5 Drawing Figures

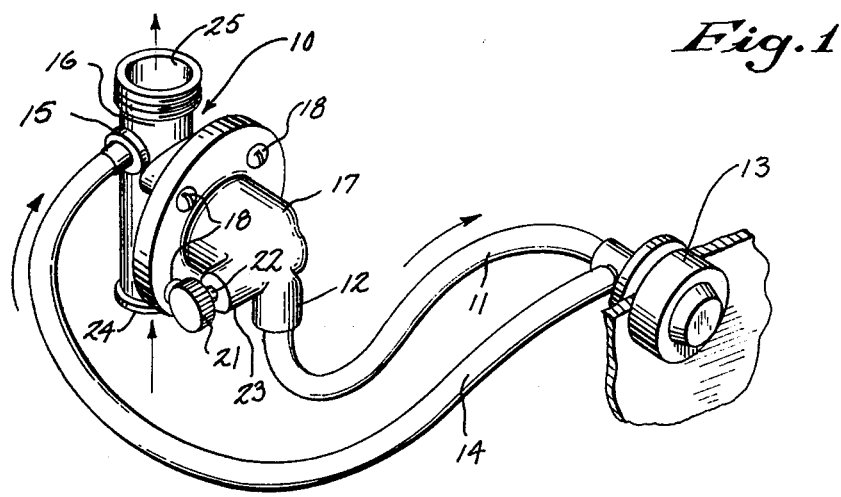
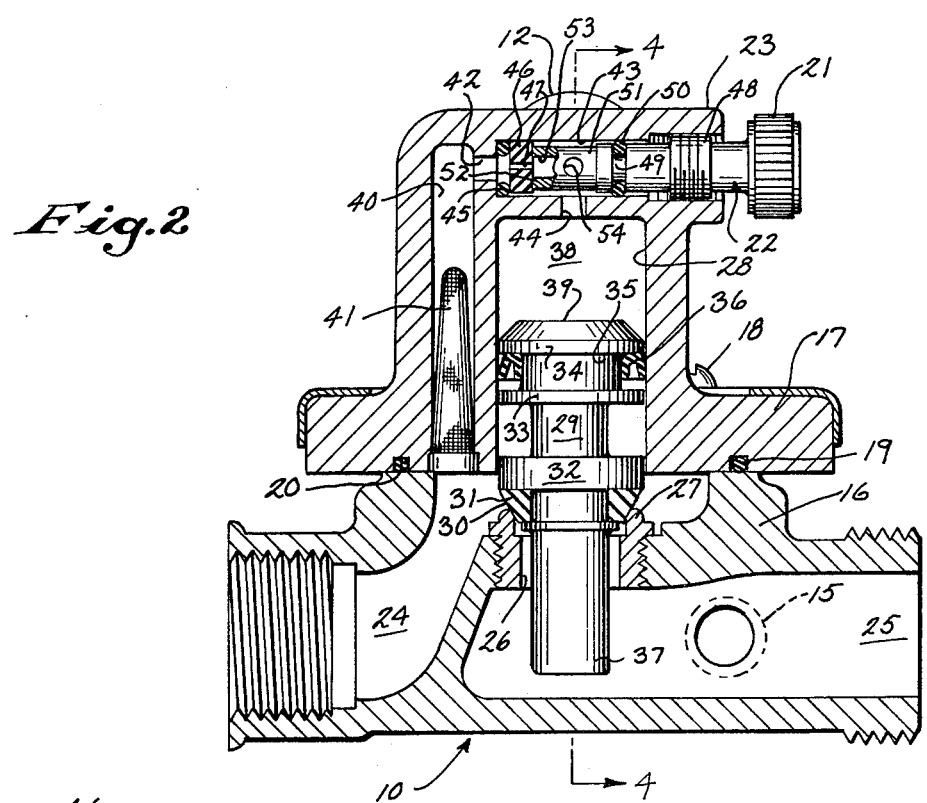
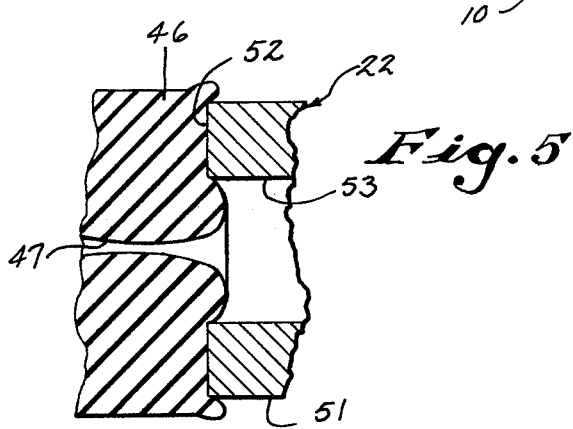

REMOTE ACTUATED METERING VALVE

BACKGROUND OF THE INVENTION

This invention relates to a remote actuated metering valve system which includes a main metering valve with an adjustable closing period and at least one remote actuating valve. The preferred embodiment of the system is especially useful for washing fixture installations, but the invention is not limited to this application and may be utilized in other fixtures where the same operating characteristics are desired.

Representative of washing fixture arrangements which employ remotely operated valves with adjustable closing periods are those disclosed in U.S. Pat. No. 2,243,957 to H. E. Heine et al. dated June 3, 1941 and U.S. Pat. No. 2,836,080 to H. J. Mullett, dated May 27, 1958. In each of these patents, the valve is actuated by a lever which is connected to the valve by mechanical linkages. Although the use of mechanical linkages for controlling the flow in washing fixtures such as stationary washfountains is well accepted and satisfactory, there is a need for a remote actuated valve system which can be used in washing fixture arrangements and other applications where valves with mechanical linkages are unsuitable, for example, in arrangements intended for use by handicapped persons.

SUMMARY OF THE INVENTION

It is the general object of the present invention to disclose a simple, inexpensive, maintenance free, remote actuated metering valve system for controlling fluids, especially in shower arrangements.

It is a further object of the present invention to disclose a simple, inexpensive metering valve which can be readily activated by a remotely located, simple, conventional push button relief valve which is connected to the metering valve by flexible tubing. The use of flexible tubing to connect the valves permits the push button relief valve which is the actuating mechanism to be positioned in almost any convenient location which is not possible in systems where mechanical linkages are employed to connect the actuating mechanism to the metering valve.

The remote actuated metering valve system of the present invention includes a main metering valve and at least one remote actuating relief valve connected to the main valve by tubing. The main metering valve has an inlet and an outlet with a valve seat between them and a movable piston which when the valve is in the normal closed position has its front face seated on the valve seat and its elongated nose projecting through the valve seat. The piston is maintained there by supply line pressure which is transferred via a bypass timing circuit to a pressure chamber behind the piston where it is sensed by the rear face of the piston. The pressure chamber of the main valve is connected by tubing to a normally closed remote push button relief valve. A second length of tubing leads from the relief valve to the supply source at a point downstream of the valve seat. When the push button of the relief valve is depressed, the relief valve is opened allowing the pressure in the pressure chamber of the main valve to be reduced. Inlet pressure on the front face of the piston forces it off the valve seat and forces fluid out of the pressure chamber out through the remote relief valve. As soon as the push button is released, the relief valve closes and the timing of the flow period starts. Inlet fluid flowing through the bypass timing circuit passes through a timing mechanism refilling the pressure chamber at a controlled rate. The preferred timing mechanism comprises a disc of deformable material which is positioned in a bore in the bypass circuit and has an axial opening through which fluid must pass to reach the pressure chamber and an adjustable member which is employed to selectively exert an axially directed force upon the disc to deform the material of the disc into the axial opening thereby effectively reducing its effective diameter. The more the disc is compressed the smaller the effective diameter of the disc and longer the flow period.

It is another object of the present invention to provide an inexpensive metering valve body which is formed from two simple formed bodies which are manufactured using only simple cores and a minimum of machining.

The foregoing and other objects and advantages of the invention will appear from the description which follows. In the description reference is made to the accompanying drawings which form a part hereof and in which there is shown by way of illustration and not limitation a preferred embodiment of the invention.

BRIEF DESCRIPTION OF THE DRAWINGS

FIG. 1 is a perspective view showing the remote actuated metering valve system of the present invention;

FIG. 2 is an enlarged view in cross section of the preferred embodiment of the metering valve shown in FIG. 1 in a closed position;

FIG. 5 is an enlarged view showing a portion of the timing mechanism of the preferred embodiment in which the timing disc is subject to an axial force.

DESCRIPTION OF THE PREFERRED EMBODIMENT

Figure 3:
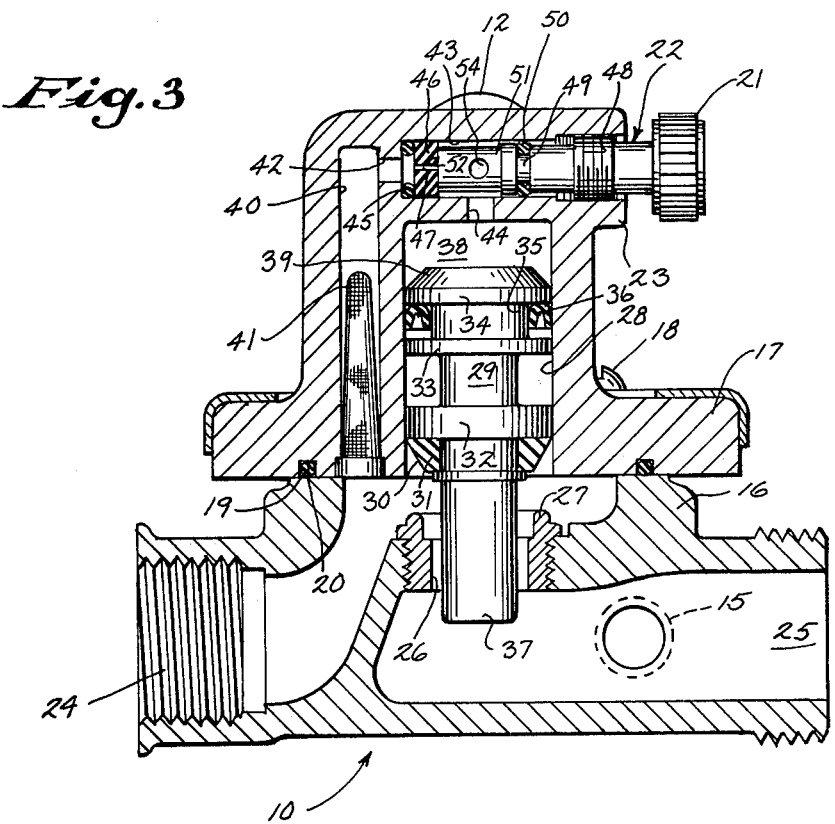
FIG. 3 is a cross sectional view of the embodiment of the metering valve shown in FIG. 2 in a partially open position.

Referring now to FIG. 1, a remote actuated metering valve system includes a main metering valve 10, a length of tubing 11 which leads from an outlet boss 12 on the main valve to a push button relief valve 13 and a second length of tubing 14 which leads from the relief valve back to an inlet boss 15 on the main valve.

In FIGS. 1 and 2, it can be seen that the main metering valve 10 is comprised of a lower body portion 16 and an upper cover 17. As seen in FIG. 2, the lower body portion 16 and the cover 17 are joined by screws 18 and an o-ring 19 is positioned in a recess 20 on the underside of the cover 17 to provide a fluid-tight seal. As best seen in FIG. 1, the knurled end 21 of a timing adjustment member 22 extends from a projection 23 on the cover.

Referring now specifically to FIG. 2, it can be seen that the lower body portion 16 has an internal threaded inlet passage 24, an externally threaded outlet passage 25 and a port 26 interconnecting the passages 24 and 25. A renewable valve seat 27 is inserted in the port 26. Positioned above the valve seat 27 in the cover portion 17 of the valve body is a cylindrical cavity 28 in which a movable piston 29 is positioned. The front face 30 of the piston is provided with a seat washer 31 which is seated upon the valve seat 27 when the valve 10 is in normally closed position.

Figure 4:
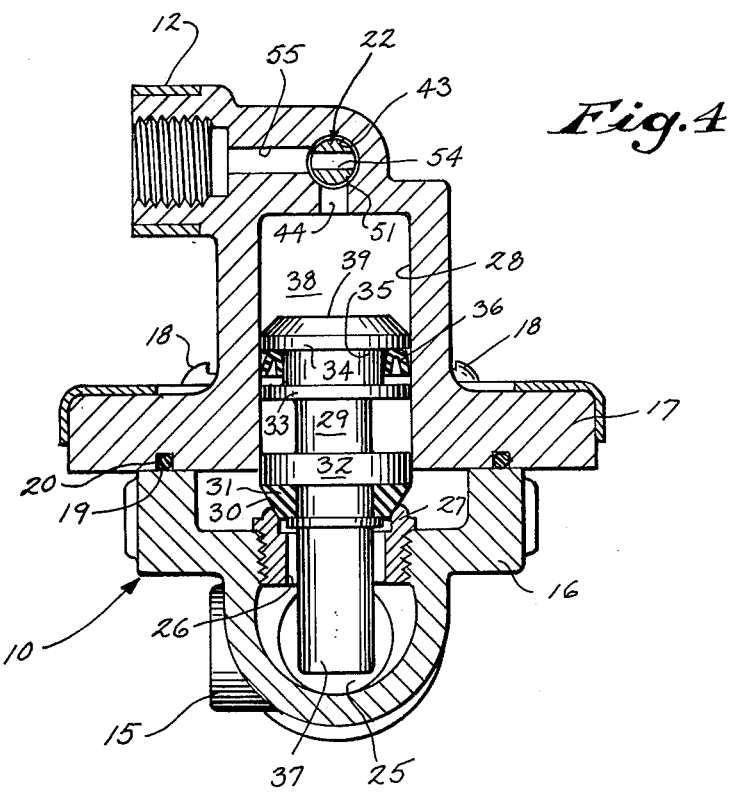
FIG. 4 is a view taken along lines 4—4 of FIG. 2.

In FIGS. 2, 3 and 4, it can be seen that the piston 29 is provided with three radial flanges, 32, 33 and 34 which help guide the piston for vertical motion within the cylindrical cavity 28. Located beneath the upper flange 34 in a circumferential groove 35 is a U-cap washer 36 which is of a resilient material and provides a fluid-tight seal with the inner wall of the cavity 28 even when the piston moves. The piston 29 is also provided adjacent its front face 30 with an elongated nose 37 which extends through the renewable valve seat 27 into the outlet 25 even when the valve 10 is in the open position.

Returning now to FIGS. 2 and 4, it can be seen that when the valve 10 is in the closed position, a pressure chamber 38 exists in the cavity 28 above the rear face 39 of the piston. The piston is maintained in closed position with the seat washer 31 seated on the valve seat 27 by supply line pressure which is transferred from the inlet 24 through a bypass timing circuit to the pressure chamber 38 where it is sensed by the rear face 39 of the piston. The bypass circuit which leads from the inlet 24 to the pressure chamber 38 includes a vertical passage 40 which is equipped with a filter 41, a second passage 42 which leads from the top of the passage 40 to a bore 43 in which the timing mechanism is positioned and a relatively short passage 44 which leads from the bore 43 to the pressure chamber 38.

In FIGS. 2 and 3, it can be seen that the timing mechanism which is positioned in the bore 43 includes an o-ring 45 which serves as a support for a timing disc 46 of deformable material which has an axial opening 47 extending therethrough. In order to enter the pressure chamber 38, fluid must pass through the axial opening 47 in the disc 46. The rate of flow through the opening 47 is controlled by the timing adjustment member 22 which includes the large knurled head 21, an intermediate portion 48 which is suitably threaded for retention in the bore, a stepped neck 49 on which an o-ring 50 is positioned and a cylindrical shaft 51 which terminates in a flat end 52. As seen only in FIG. 2, the cylindrical shaft 51 has an axial opening 53 which is aligned with the opening 47 in the disc. Communicating with the opening 53 is a radially extending passage 54 which leads to the outside of the shaft 51. A fluid-tight seal is maintained between the outer walls of the timing adjustment member 22 and the bore 43 by the o-ring 50.

In order for fluid to reach the pressure chamber 38, it must first pass through the axial opening 47 in the disc 46, the axial opening 53, and the radial opening 54 in the shaft and flow about the outside of the shaft 51 to the passage 44 which leads to the pressure chamber 38. When the valve 10 is closed, the bypass circuit and the pressure chamber 38 are filled with fluid and full supply line pressure is sensed by the rear face 39 of the piston which maintains the valve in the closed position.

The metering valve 10 is actuated when the remote relief valve 13 is opened by depressing the push button to allow pressure in the pressure chamber 38 to be reduced. As soon as the pressure is reduced, inlet pressure acting on the seat washer 31 forces the piston off the valve seat 27 as seen in FIG. 3. The piston is moved upward in the cavity 28 as a result of supply line pressure acting upon the front face 30 of the piston forcing the fluid that was in the pressure chamber 38 out of the passage 44 into the bore 43 around the shaft 51 and out the passage 55 which is seen only in FIG. 4. The displaced fluid flows from passage 55 through outlet bore 12 and the tubing 11, through the valve 13, the tubing 14, and the inlet boss 15 into the main valve downstream of the valve seat 27.

As soon as the piston has risen to the top of the cavity 28 and the push button of the relief valve 13 is released so that the relief valve is closed, the timing of the flow period starts and the pressure chamber 38 begins to once again fill by controlled flow through the timing mechanism. As the pressure chamber 38 refills, the fluid entering the chamber moves the piston 29 towards the valve seat 27 because the pressure sensed by the rear face 39 of the piston is greater than that sensed by the front face 30. The pressure on the front face 30 is less because the elongated nose 37 of the piston which extends through the valve seat 27 and into the outlet 25 even when the valve is in the open position causes a pressure drop across the valve seat 27 at normal flow which urges the piston towards the seated position. A pressure drop of 2–5 psi occurs at normal flow because of the clearance between the piston nose 37 and the valve seat 27. As a result, full supply line pressure acts upon the rear face 39 of the piston producing a closing force which is approximately equal to the area of the piston nose 37 times the pressure drop across the seat 27 acts on the front face 30 of the piston. The sense of the force on the piston 29 is to lower it toward the seated or shut off position. Of course, the piston will not seat to close the valve until the pressure on the rear face of the piston is greater than that on the front face.

In the preferred embodiment of the invention, the disc 46 is a relatively thick circular member of a deformable elastomeric material such as butyl rubber and the axial opening 48 is 0.01 inches to 0.02 inches in diameter. The external diameter of the disc 46 is such that when it is placed in position in the bore 43 it is completely contained about its periphery so that when it is subjected to an axial force the material of the disc is deformed into the opening 47 effectively reducing its diameter as seen in FIG. 5. The more the disc 46 is compressed the smaller the effective diameter of the opening 47 and the longer the flow period. The timing mechanism of the metering valve of the preferred embodiment bcause of its unique single opening geometry provides a much less obstructed flow passage than do prior timing mechanisms such as needle valves. Therefore, the preferred timing mechanism is less susceptible to problems caused by foreign materials which may be suspended or dissolved in the fluid being controlled.

The push button relief valve 13 which is seen only in FIG. 1 is a conventional normally closed spring loaded poppet valve which opens when the push button is depressed. Such valves are commercially available, inexpensive and reliable.

It will be readily apparent to those skilled in the art that the preferred embodiment of the remote actuated metering valve system which has been described to illustrate the present invention is unusually simple, inexpensive and maintenance free. It will also be apparent that a number of changes and modifications may be made without departing from the spirit and scope of the present invention. For example, while a system employing only one remote actuated valve has been described it will be apparent that more than one such valve can be manifolded to the metering valve to operate the valve independently from several locations if so desired. In addition, under extremely low flowing pressure (35 psi) and flows less than 2 GPM a spring can be placed in the cavity 28 above the rear face of the piston to give a less sensitive timing adjustment. Furthermore, the various components of the valve can be changed in either size or shape as long as they perform their required functions. Therefore, no limitations are to be placed upon the invention other than those set forth in the following claims.

We claim:

1. In a remote actuated timed metering valve system for controlling the flow of water which valve system includes a main metering valve, and a remote actuated, normally closed, relief valve connected to the main valve by flexible tubing, the improved main valve which includes a lower body portion having an inlet and an outlet connected by a port surrounded by a valve seat; a cover portion secured to the lower body portion, said cover portion including a piston receiving cavity, a movable piston positioned in said cavity, said piston having a front face adapted to seat on said valve seat and a rear face, a pressure chamber located behind said rear face of the piston which chamber is filled with water when the metering valve is closed; a bypass circuit for the flow of water and the transfer of supply line pressure from the inlet to the pressure chamber where the pressure can be sensed by the rear face of the piston; a timing mechanism located in said bypass circuit and a filter located in said bypass circuit between the inlet and the timing mechanism, in which:

(a) the front face of the piston has an elongated nose which projects below the valve seat even when the valve is open and clearance between the piston nose and the valve seat results in a pressure drop across the seat at normal flow so that a reduced pressure acts on the front face of the piston while substantially full supply line pressure acts upon the rear face of the piston and the sense of the force is to move the piston towards a seated position;

(b) the timing mechanism includes in series in a bore in the bypass circuit an O-ring, a disc-like member of deformable elastomeric material completely contained about its periphery by said bore and aligned with and in contact with said O-ring, said member having an axial opening about 0.01 inches to 0.02 inches in diameter through which water must pass to reach the pressure chamber and a timing adjustment screw having an axial passageway which is aligned with the axial opening in the disc member and a radial passage which leads from the axial passageway to the pressure chamber of the valve, which timing adjustment screw can be adjusted to exert an axially directed force upon the disc-like member to deform the elastomeric material of the disc-like member into the axial opening thereby reducing its effective diameter and thus controlling the time required for water to fill the pressure chamber and close the valve; and (c) the main valve has an outlet port leading from the pressure chamber and an inlet port which communicates with the outlet of the main valve downstream of the valve seat, whereby the remoted actuated, normally closed, relief valve may be connected to the outlet port of the main valve by a first length of flexible tubing and to the inlet port by a second length of flexible tubing so that when the normally closed valve is opened the water present in the pressure chamber of the main valve leaves by flowing through the first length of tubing to the remote valve thus relieving the pressure on the rear face of the piston of the main valve permitting the piston to be moved to an opened position by the force of supply line pressure on its front face and the water leaves the relief valve via the second length of tubing and enters the main valve downstream of the valve seat.

* * * * *